Jan. 2, 1962  R. G. RICHARDS ET AL  3,015,653
MALEIC ANHYDRIDE-STYRENE-ACRYLONITRILE TERPOLYMER
Filed Jan. 6, 1958  2 Sheets-Sheet 1

TERPOLYMER COMPOSITION (ABCEG)
30 TO 60% BY WGT. MALEIC ANHYDRIDE
2 TO 20% BY WGT. ACRYLONITRILE
30 TO 68% BY WGT. STYRENE

TERPOLYMER COMPOSITION (DEFH)
38 TO 60% BY WGT. MALEIC ANHYDRIDE
2 TO 6% BY WGT. ACRYLONITRILE
34 TO 56% BY WGT. STYRENE

FIG. I

INVENTORS
ROGER G. RICHARDS
EDMOND R. OSGOOD

BY Warburton & Cross

ATTORNEYS

INVENTORS
ROGER G. RICHARDS
EDMOND R. OSGOOD

BY Harburton & Cross

ATTORNEYS

United States Patent Office 3,015,653
Patented Jan. 2, 1962

3,015,653
MALEIC ANHYDRIDE-STYRENE-ACRYLO-
NITRILE TERPOLYMER
Roger G. Richards and Edmond R. Osgood, Painesville,
Ohio, assignors to Diamond Alkali Company, Cleveland, Ohio, a corporation of Delaware
Filed Jan. 6, 1958, Ser. No. 707,420
25 Claims. (Cl. 260—78.5)

This invention relates to novel ternary interpolymers of styrene, maleic anhydride, and acrylonitrile, and to the preparation and applications of such interpolymers.

This is a continuation-in-part of my pending application Serial No. 528,037, now abandoned, filed August 12, 1955.

Up to the present time, various copolymers of styrene and maleic anhydride have been known, and their use suggested in various surface coating applications. Copolymers of styrene and acrylonitrile have been found generally to lack water-solubility, thus limiting or precluding their use in many instances. Copolymers of maleic anhydride and acrylonitrile are, relatively speaking, unimportant, insofar as many commercial applications are concerned, because of the difficulty usually encountered in effecting the desired copolymerization.

Certain terpolymers of styrene, maleic anhydride and acrylonitrile have heretofore been suggested for use in plastic molding operations where a relatively brittle, castable product was desired. These prior terpolymers generally may be characterized as high styrene-low maleic anhydride interpolymers.

Since styrene, maleic anhydride, and acrylonitrile are well known and useful substances severally, the quest for an advantageous interpolymer containing these ingredients has continued, despite the knowledge that possible copolymers, and the abovementioned terpolymer, which while perhaps useful in a particular application, lack many qualities desirable in other applications.

It is, therefore, a principal object of this invention to provide a new and improved ternary interpolymer of styrene, acrylonitrile and maleic anhydride.

It is a further object of the invention to provide a novel method of preparing a ternary interpolymer of styrene, acrylonitrile and maleic anhydride.

A still further object of the invention is to provide a new and improved suspending agent for use in suspension polymerization of unsaturated polymerizable materials.

These and other objects and advantages of the invention will more readily appear from the following description.

The discovery has now been made that a new and different ternary interpolymer having highly advantageous properties is obtained by interpolymerizing a mixture of acrylonitrile monomer, maleic anhydride, and styrene monomer, to produce an interpolymerized product containing 30 to 60% by weight maleic anhydride, 2 to 20% by weight acrylonitrile and 20 to 68% by weight styrene. This invention relates to such a terpolymer, its salts, especially water-soluble salts, and other functional derivatives, and to its applications. A preferred terpolymer is the interpolymerization product of 38 to 60% by weight of maleic anhydride, 2 to 6% by weight of acrylonitrile, and 34 to 56% by weight of styrene.

Preferred terpolymer derivatives include water-soluble salts of the terpolymer such as alkali metal salts, e.g., sodium, potassium, lithium, cesium, and rubidium salts, and ammonium salts such as those produced by treating the terpolymer with ammonia, ammonium carbonates or ammonium hydroxide.

A further characteristic of a preferred terpolymer embodying this invention is a specific viscosity, measured by an Ostwald viscosimeter in cyclohexanone, of from about 0.5 to 3.5, 1.0 to 2.5, being typical. In some instances lower viscosities, for example, 0.17 in water for a 1% terpolymer solution at 30° C., also are advantageous.

Referring now to the accompanying drawings.

Figure 1:
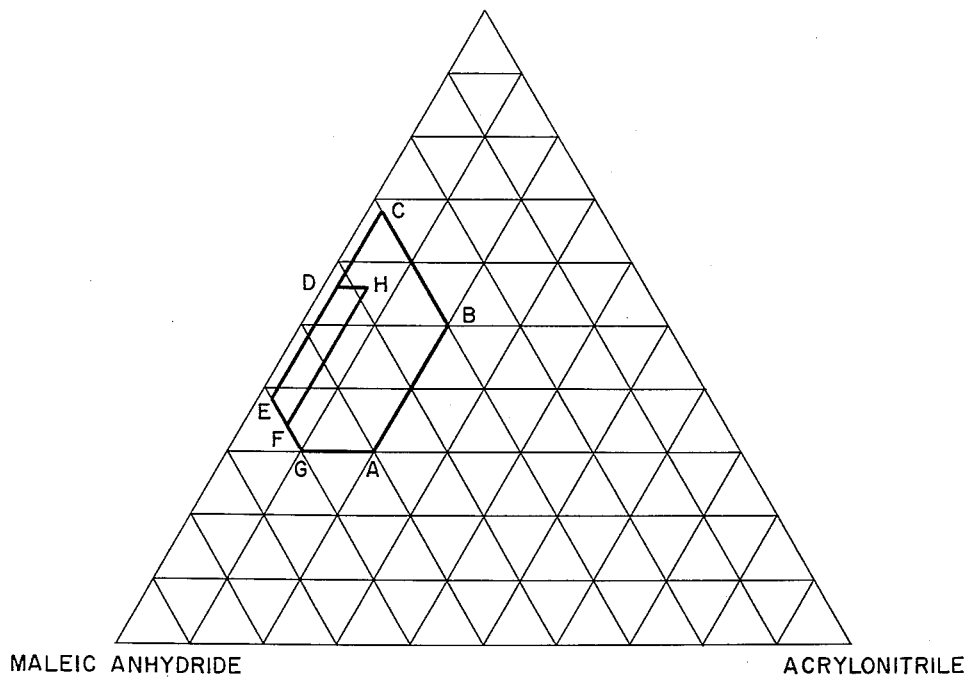
FIGURE 1 is a ternary plot defining terpolymers of this invention.

Referring more particularly to the drawings, the ternary plot of FIGURE 1 shows a terpolymer composition, i.e., ABCEG, defining the terpolymer composition of the invention as one containing 30 to 60% by weight of maleic anhydride, 2 to 20% by weight of acrylonitrile, and 20 to 68% by weight of styrene. In many instances, superior results are obtained when the terpolymer composition, within this general range, contains from about 2 to 10% by weight of acrylonitrile.

Within this composition range there is illustrated a composition range DEFH defining a composition containing 38 to 60% maleic anhydride, 2 to 6% acrylonitrile, and 34 to 56% styrene, this composition range constituting a preferred terpolymer especially advantageous as a suspending agent in suspension polymerization of various monomers, notably vinyl chloride.

Terpolymers embodying the invention may be employed in a variety of applications where the terpolymer characteristics imparted by the several interpolymerized ingredients render their use desirable. For example, terpolymers of this invention are useful as sizing, thickening, or stiffening agents, in the treatment of soil as soil suspending agents, as ion exchange resins, and, at times, as adhesives, cast films, or extrudable material. The terpolymers may be utilized in the form of aqueous solutions or employed dissolved or dispersed in an organic solvent, diluent, extender, or the like.

Figure 2:
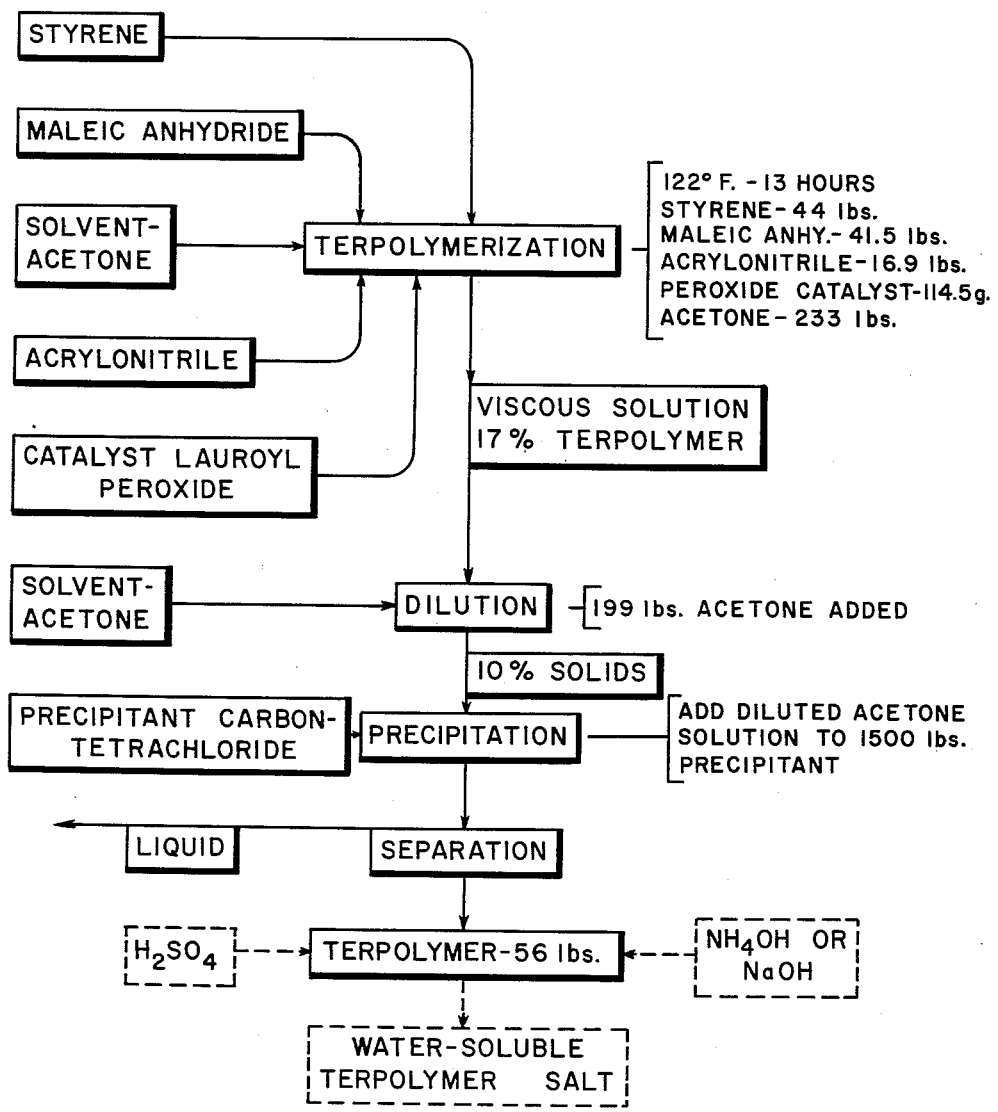
FIGURE 2 is a schematic flow diagram illustrating the preparation of a terpolymer embodying the present invention.

In FIGURE 2 there is shown one specific method of preparing a terpolymer of this invention by the solution polymerization technique. In this process, the monomeric mixture, dissolved in a solvent, i.e., acetone, is subjected, at room temperature if desired, or preferably to an elevated temperature, typically within the range from 40° C. to the reflux temperature of the solvent, e.g., using acetone, a solvent for both monomer and polymer, to a temperature of 56.5° C., preferably at 50° C. (122° F.), for a period of time sufficient to effect the desired interpolymerization. An elevated pressure need not be maintained during the terpolymerization although in some instances where a higher reaction temperature is desired, superatmospheric pressure may be applied.

The solvent for the monomer may be selected from those materials which are also solvents for the terpolymer, e.g., ketones such as acetone, methyl ethyl ketone, or the like, thus constituting a so-called "solvent-solvent" system. Alternatively, the monomer solvent may be selected from those materials which are non-solvents for the terpolymer, e.g., aromatic hydrocarbons such as xylene, benzene or toluene; halogenated aliphatic hydrocarbons such as carbon tetrachloride, methylene chloride, tetrachlorethylene, trichlorethylene or ethylene dichloride; or the like. In practice, various catalysts may be used, typically a peroxide catalyst, such as lauroyl peroxide, benzoyl peroxide, 2,4-dichlorobenzoyl peroxide, caprylyl peroxide, o-methoxy benzoyl peroxide, or a redox system consisting of benzoin and a peroxide such as lauroyl peroxide, in an amount from about 0.1 to 1.0% by weight of the monomer mixture, 0.25% being preferred. The reaction vessel preferably is provided with an agitator and heating means, e.g., a steam jacketed reactor.

Unless a monomer solvent which is a non-solvent for the terpolymer is used, the resultant terpolymer solution then is diluted to facilitate precipitation therefrom and a precipitant liquid added. Illustrative precipitants are ethers such as ethyl ether, n-propyl ether, isopropyl ether, or diethyl carbitol; aromatic hydrocarbons such as xylene, benzene or toluene; aliphatic hydrocarbons such as n-hexane, n-heptane, n-octane, or n-decane; halogenated aliphatic hydrocarbons such as carbon tetrachloride, methylene chloride, tetrachlorethylene, trichlorethylene, ethylene dichloride, or the like.

The filtrate is separated, and the resultant solid terpolymer may be employed as such, subjected to washing and/or other purification, or, if desired, converted to a water-soluble salt or other functional derivative, as by the addition of ammonium hydroxide or sodium hydroxide.

In the specific process illustrated in FIGURE 2, acetone is employed as a solvent for the monomeric mixture, and lauroyl peroxide is utilized as a catalyst. The resultant polymerizable mixture is then heated to a temperature of 50° C., and maintained at that temperature for 20 hours with continuous agitation. There results a viscous solution containing 17% terpolymer, which solution is diluted with acetone to provide a solution containing 10% solids. To this dilute solution is then added sufficient carbon tetrachloride, or other suitable precipitant, to effect substantially complete precipitation of the terpolymer.

The solid terpolymer is then separated by filtration and either employed as such, subjected to alkaline hydrolysis by treatment with ammonium hydroxide or sodium hydroxide, e.g., 800 to 1900 parts water containing 100 parts concentrated ammonium hydroxide and 100 parts terpolymer, to form a water-soluble terpolymer salt. Alternatively, as indicated, the terpolymer may be acid hydrolyzed typically using a concentrated inorganic acid solution. In some instances, no salt need be formed of the terpolymer since its water solubility frequently is sufficient to permit its use without conversion to a more water-soluble form.

While the terpolymer preparation has thus far been described as a solution polymerization technique, other known polymerization techniques also can be used if desired, e.g., suspension, emulsion, and bulk polymerization, although these latter techniques frequently do not permit obtention of as accurate a molecular weight control as is possible by the solution polymerization process.

The proportions of the monomers employed in the preparation of the terpolymer may, of course, be varied depending upon the particular application intended. However, it is essential that insofar as the practice of this invention is concerned the resultant terpolymer lie within the composition range defined by the points ABCEG in FIGURE 1.

While a terpolymer of this invention may contain from 30 to 60% by weight maleic anhydride, 2 to 20% by weight acrylonitrile, and 20 to 68% by weight styrene, it has been found that superior results are obtained in the suspension of monomeric substances to be polymerized by using as a suspending agent a terpolymer containing about 2 to 10% by weight acrylonitrile and substantially equal proportions of maleic anhydride and styrene. As indicated hereinbefore, a terpolymer containing 38 to 60% maleic anhydride, 2 to 6% acrylonitrile and 34 to 56% styrene is especially advantageous. A typical terpolymer containing 3.18% by weight acrylonitrile, 48.30% by weight maleic anhydride, and 48.52% by weight styrene, can be prepared by techniques hereinbefore described. The bulk density of such a polymer advantageously is of the order of 0.276 gm./cc., with a particle size distribution such that 92% of the polymer passes through a 40 mesh screen. Such a terpolymer is soluble in acetone.

In practice it is convenient to employ such a terpolymer dissolved in water containing an excess of ammonium hydroxide, for example, a 4% by weight solution of terpolymer in the form of its ammonium salt can readily be prepared by adding the proper amount of terpolymer to water containing a sufficient amount of ammonium hydroxide and heating the resultant mixture with agitation almost to the boiling point to obtain a clear water white solution having a pH of about 8.0.

In order that those skilled in the art may more completely understand the present invention and the preferred methods by which the same may be carried into effect, the following specific examples are offered:

EXAMPLE I

Into a glass lined, steam jacketed reactor, equipped with an agitator, are introduced 9.8 lbs. of maleic anhydride, in 47 lbs. of acetone, 10.4 lbs. of styrene, 4 lbs. of acrylonitrile, and 0.12 lb. of peroxide catalyst (Alperox-C) in 8 lbs. of acetone. Agitation is then begun and the kettle is heated to and maintained at, 50° C. for 18 hours. The contents of the reactor are then transferred to a precipitation tank and diluted with 47 lbs. of acetone. The terpolymer is then precipitated by the addition of 350 lbs. of carbon tetrachloride to the agitated terpolymer-acetone solution. The resultant slurry is then filtered and the solid terpolymer collected and dried.

If desired, to permit more accurate control of the terpolymerization reaction, a small amount of a polymerization inhibitor, such as t-butyl catechol, may be introduced when the conversion has been carried out to the desired extent.

EXAMPLE II

The terpolymer (100 parts) obtained by the process of Example I is added to water (1900 parts) and treated with concentrated ammonium hydroxide (100 parts) at a temperature just below the boiling point to form a water-soluble ammonium salt. A second portion of the terpolymer is similarly treated with sodium hydroxide to form the corresponding water-soluble sodium salt.

EXAMPLE III

Into a round bottom flask equipped with an agitator and reflux container are introduced 350 ml. of benzene, 27 gm. of distilled acrylonitrile, 49 gm. of maleic anhydride and 2 gm. of caustic-washed styrene. The resultant solution is heated with agitation to its reflux temperature, i.e. 83°–85° C., and there is gradually added thereto 0.32 gm. of benzoyl peroxide in 50 ml. of benzene and 10 gm. of styrene monomer. After a total reaction time of two hours, including heating time, the polymerized product is precipitated from the solution, dissolved in acetone and reprecipitated by adding the acetone solution of terpolymer to a larger volume of water. The resultant polymer, after filtration and drying over calcium chloride, weighs 13 gm. and has the following composition:

| Monomer: | Percent by wgt. |
| --- | --- |
| Acrylonitrile | 10 |
| Maleic anhydride | 32 |
| Styrene | 58 |

EXAMPLE IV

Into a Pyrex container are introduced equal molar proportions of maleic anhydride, acrylonitrile and styrene, together with 0.50% by weight of monomer mixture of benzoyl peroxide catalyst. The Pyrex container is then sealed and heated in an oven at 62° C. for two hours. The resultant polymer is dissolved in acetone, precipitated by addition of the acetone solution to water is separated, and treated with 85% sulfuric acid. The thus-formed terpolymer is collected on a filter, washed free of sulfate ion, dried and dissolved in distilled water containing a small amount of ammonia. There is obtained a 68% conversion and the terpolymer product has a specific viscosity, in a 1% water solution, of 2.52.

EXAMPLE V

To illustrate the use of various solvents for use in the solution terpolymerization of styrene, maleic anhydride and acrylonitrile, experiments are conducted wherein n-hexane, benzene, a benzene-methanol mixture, xylene, carbon tetrachloride and methylene chloride are employed. The experimental procedure of Example I is followed, the terpolymer precipitating from the solvent-non-solvent systems.

EXAMPLE VI

Into a glass-lined reactor are introduced 49 gm. of maleic anhydride, 27 gm. of distilled acrylonitrile and 52 gm. of uninhibited styrene, together with 350 ml. of acetone and 0.30 gm. of peroxide catalyst (Alperox-C). The thus-formed reaction mixture is heated at 50° C. for 18 hours. The resultant acetone solution of terpolymer is divided into two portions, the first of which is added to water at room temperature in order to precipitate terpolymer while the second portion of the acetone solution is added to ethyl ether. In each case, satisfactory precipitation of the terpolymer is obtained.

EXAMPLE VII

To illustrate the advantageous effect of nitrogen purging of a reactor prior to terpolymerization therein, there are introduced into glass-lined reactors which have been purged with nitrogen, 294 gm. of maleic anhydride, 312 gm. of uninhibited styrene, 162 gm. of distilled acrylonitrile, i.e., the fraction distilling at 74°–76° C., 1.8 gm. of peroxide catalyst (Alperox-C) in 100 ml. of acetone, and 2 liters of acetone. There results 475 ml. of polymerizable solution. The thus-formed mixture is heated to a temperature of 50° C. with continuous agitation for various periods of time. A corresponding polymerizable mixture is prepared and treated similarly, except that its reactor is not purged with nitrogen. The results of such tests are indexed comparatively in the following table:

| Reactor Not Purged | | | | Reactor Purged With Nitrogen | | | |
| --- | --- | --- | --- | --- | --- | --- | --- |
| Reactor No. | Time (hrs.) | Yield (g.) | Conv., (Percent) | Reactor No. | Time (hrs.) | Yield (g.) | Conv., (Percent) |
| 1 | 7 | 24.0 | 18.7 | 4 | 7 | 44.0 | 34.3 |
| 2 | 11 | 47.3 | 36.9 | 5 | 11 | 55.0 | 43.0 |
| 3 | 15½ | 67.0 | 52.4 | 6 | 15½ | 75.0 | 58.6 |

The above table shows that the induction period for the polymerization of the three monomers is substantially reduced by purging with nitrogen, i.e., higher conversions being obtained in a given length of time.

EXAMPLE VIII

To illustrate that commercially available styrene and acrylonitrile monomers may be employed without removal of any inhibitors, a terpolymer is prepared using the technique of Example I by reacting 52 gm. of inhibited styrene, 20 gm. of inhibited acrylonitrile, and 49 gm. of maleic anhydride dissolved in 350 ml. of acetone. The resultant mixture is solution polymerized at 50° C. for 18 hours, and a 68% conversion is obtained after precipitating the terpolymer with carbon tetrachloride and drying. The thus-formed terpolymer is substantially equivalent to a terpolymer formed using corresponding proportions of uninhibited monomers, and has a specific viscosity of 1.95 measured in cyclohexanone.

EXAMPLE IX

To illustrate the preparation of terpolymer in a solvent-non-solvent system, there are added to a glass reactor 49 gm. (0.5 mol) maleic anhydride, 52 gm. (0.5 mol) styrene, and 20 gm. acrylonitrile, 0.3 gm. Alperox-C (lauroyl peroxide) and 300 ml. carbon tetrachloride as a solvent for the monomer. Polymerization is carried out for 18 hours at 50° C. whereupon the polymer, which is not soluble therein, separates. The polymer is dried in air, ground and dried further at 85° C. for 72 hours. The specific viscosity is 3.45.

EXAMPLE X

Into a 2-liter, 3-necked round bottomed flask equipped with a stirrer, heating mantle, reflux condenser and gas inlet are introduced 52 gm. of styrene, 49 gm. maleic anhydride, 20 gm. acrylonitrile, 0.30 gm. Alperox-C (lauroyl peroxide) and 350 ml. of xylene as a solvent. Polymerization is carried out at 50° C. for 18 hours and the resultant polymer, insoluble in xylene, exhibits excellent properties.

EXAMPLE XI

Maleic anhydride dissolved in acetone is added slowly from a dropping funnel to a refluxing solution of acetone, caustic-treated styrene [1], distilled acrylonitrile and Alperox-C (lauroyl peroxide). The resultant polymer is separated by adding the terpolymer-acetone solution to an agitated carbon tetrachloride solution, filtering, collecting and drying the polymer. The quantities and reaction conditions are indexed comparatively as follows:

| Terpolymer No. | 1 | 2 | 3 | 4 | 5 |
| --- | --- | --- | --- | --- | --- |
| Reaction Time (hrs.) | 3 | 3½ | 13 | 18 | 12½ |
| Addition Time (hrs.) | 2½ | 3½ | 12 | | 12 |
| Reaction Temp., (° C.) | 61–62 | 64–66 | 60–61 | 50 | 60–61 |
| Styrene (g.) | 52 | 52 | 208 | 52 | 208 |
| Acrylonitrile (g.) | 26.5 | 26.5 | 106 | 26.5 | 106 |
| Maleic Anhydride (g.) | 24.5 | 24.5 | 98 | 24.5 | 123 |
| Alperox-C (g.) [1] | 1.03 | 0.60 | 2.4 | 0.39 | 2.4 |
| Acetone (total ml.) | 350 | 200 | 1,400 | 350 | 1,400 |
| Maleic Anhydride (percent) | 31.6 | 26.9 | 24.0 | 38.7 | 30.0 |
| Specific Viscosity | 0.84 | 0.99 | 0.82 | 1.64 | |

[1] lauroyl peroxide.

EXAMPLE XII

The general procedure of the preceding Example XI is repeated with the following reactants, reaction conditions and results:

[1] Washed with 5–10% NaOH to remove inhibitor t-butyl catechol.

| Terpolymer No. | 1 | 2 | 3 | 4 |
| --- | --- | --- | --- | --- |
| Reaction Time (Hrs.) | 3 | 6⅛ | 7 | 5¾ |
| Addition Time (Hrs.) | 3 | 6 | 7 | 3¼ |
| Reaction Temp. (° C.) | 62 | 60–61 | 60–65 | 47.5–51 |
| Styrene (g.) | 52 | 208 | 208 | 201 |
| Acrylonitrile (g.) | 26.5 | 106 | 106 | 103 |
| Maleic Anhydride (g.) | 24.5 | 123 | 123 | 117 |
| Catalyst | Alperox-C [1] | Luperco CDB [2] | Alperox-C | Alperox-C |
| Catalyst (g.) | 0.60 | 2.4 | 1.2 | 1.2 |
| Activator | Benzoin | | | |
| Activator (g.) | 0.30 | | | |
| Acetone (total ml.) | 350 | 1,400 | 800 | 500 |
| Maleic Anhydride (percent) | | | 28.0 | 35.0 |
| Specific Viscosity | 0.94 | 0.84 | 1.34 | 2.1 |

[1] Lauroyl peroxide.
[2] 2,4-dichlorobenzoyl peroxide (diluted with 50% dibutyl phthalate).

Use of terpolymer as suspension stabilizer

The practice of this invention particularly contemplates the use of the present terpolymer, its salts and functional derivatives as suspension stabilizers in the polymerization of unsaturated polymerizable monomers especially those compounds containing the group

e.g., vinyl esters such as vinyl acetate, vinyl formate, vinyl propionates, vinyl butyrate, styrene and the like, vinyl halides such as vinyl chloride, vinyl bromide, acrylates, vinyl fatty acid derivatives, e.g., vinyl stearate, and other unsaturated polymerizable materials including interpolymers of such materials, e.g., copolymers of vinyl acetate and vinyl chloride.

There has been a continuing problem in the field of suspension polymerization in providing a suspension stabilizer which not only is capable of establishing and maintaining the desired suspension during polymerization but also which does not adversely affect the characteristics of the desired polymer. It has been found that a terpolymer of this invention is an excellent suspension stabilizer in the suspension polymerization of a variety of polymerizable monomeric materials notably vinyl chloride and its copolymers. In this application it is particularly advantageous to employ a terpolymer containing from 2 to 10% acrylonitrile and to employ the terpolymer in the form of a water-soluble salt, such as an ammonium salt. Generally, the suspending action using a terpolymer of this invention is proportional to the concentration of terpolymer, while the colloidability and polymer particle porosity vary inversely with the terpolymer concentration.

In the polymerization of vinyl chloride and other monomeric materials conventional peroxide type catalyst, preferably monomer-soluble, in small amounts generally of the order of 0.01 to 1.6% by weight of the monomer, preferably about 0.025 to 0.20%, may be used, e.g., lauroyl peroxide, benzoyl peroxide, dicaproyl peroxide, acetyl benzoyl peroxide, diacetyl peroxide, p-tertiarybutyl perbenzoate, tertiary butyl perlaurate, de-tertiary-butyl peroxide, and, preferably, lauroyl peroxide. Further, the polymerization may, of course, be accomplished with the application of heat and/or pressure together with agitation as necessary, temperatures of 100° F. to 160° F., 115° F. to 140° F. preferred, being typical.

EXAMPLE XIII

Into a 50 gallon reactor equipped with a stream jacket, evacuation means, and an agitator are introduced 33⅓ gallons of distilled water. The pH of the water is adjusted to a value of approximately 5.0 and there is then introduced with continuous agitation, 0.1%, by total weight of monomers, of a terpolymer of this invention which has been treated with ammonium hydroxide. To this mixture is added 0.25%, by total weight of monomers, of Alperox-C (lauroyl peroxide). There is then introduced 120 lbs. of a copolymerizable mixture of 80% by weight vinyl chloride and 20% by weight of vinyl acetate, together with 4% by total monomer weight of carbon tetrachloride as a chain transfer agent.

The thus-formed reaction mass is heated, with continuous agitation, to 130° F. until a gauge pressure of 50 p.s.i. is obtained. The resultant copolymer is then removed, washed and dried. The copolymer product exhibits an improved color, as compared to a similar copolymer prepared using gelatin as a suspending agent. Moreover, the copolymer produced by the practice of this invention is more resistant to color degradation on drying at an elevated temperature than is the corresponding copolymer produced using gelatin as a suspending agent.

EXAMPLE XIV

Using terpolymers produced according to the technique of the preceding examples, experiments are conducted to polymerize vinyl chloride using the terpolymers as suspension stabilizers. The results of such experiments, carried out at 50° C. for 18 hours using a peroxide catalyst, are indexed comparatively below, the colloidability figures indicating generally an excellent colloidability value.

| Terpolymer Conc., Percent | Percent Conversion | Colloidability |
|---|---|---|
| 0.10 | 74 | 1 |
| 0.10 | 86 | 2+ |
| 0.20 | 86 | 2+ |
| 0.40 | 87 | 1 |
| 0.80 | 87 | 2+ |

Criticality of terpolymer composition

The composition ranges of the terpolymer constituents are critical in defining a ternary interpolymer embodying this invention. If styrene is omitted, substantially no copolymer is formed since the reactivity of the maleic anhydride monomer for the acrylonitrile radical is very low. If the styrene content is in excess of 68% by weight, the resultant terpolymer is too water-insoluble and too easily heat distorted. On the other hand, a terpolymer containing some styrene, but less than 30% by weight, generally is too brittle.

Similarly, a terpolymer containing less than 30% by weight of maleic anhydride is more moldable, less alkali-soluble, and generally less effective as a suspending agent. Terpolymers, of the type claimed, containing more than 50% by weight of maleic anhydride are difficult, if not impossible, to produce, because of the low reactivity of maleic anhydride.

As to the acrylonitrile content, terpolymers containing more than 20% by weight of acrylonitrile generally are poor suspending agents. Conversely, if the acrylonitrile content is less than 2% by weight, the resultant terpolymer essentially acts as a styrene-maleic anhydride copolymer with its above-mentioned difficulties due to brittleness, and high softening temperature.

EXAMPLE XV

The following table indicates the results obtained by polymerizing vinyl chloride using as suspending agents (1) a styrene-maleic anhydride copolymer, and (2) a styrene-maleic anhydride-acrylonitrile terpolymer containing 3% by weight of acrylonitrile. In each case, a 3:1 water to vinyl chloride monomer ratio is employed and the polymerization carried out at 50° C. for 18 hours with continuous agitation, using equal minor amounts of a peroxide catalyst (Alperox-C).

| pH | Conc. of Susp. Agt. (Percent by weight) | Colloidability—Acrylonitrile Content (Percent by weight) | |
|---|---|---|---|
| | | 0% | 3% |
| 9 | 0.025 | 4 | 2 |
| 9 | 0.05 | 4 | 2 |
| 8 | 0.10 | 4 | 3 |

From the foregoing data, it will be seen that the terpolymer produces a significant improvement in polyvinyl chloride colloidability.

EXAMPLE XVI

Tests similar to those carried out in the preceding example are repeated, with the inclusion of a terpolymer containing 6% by weight of acrylonitrile. The results of these tests are indexed comparatively below:

| pH | Conc. of Susp. Agt. (Percent by wgt.) | Suspending Action—Acrylonitrile Content (Percent by wgt.) | | |
|---|---|---|---|---|
| | | 0% | 3% | 6% |
| 6 | 0.10 | Good | Good | Good |
| 9 | 0.10 | Fair | Good | Fair |
| 11 | 0.10 | Poor | Good | Fair |

As the above data indicates, the 3% acrylonitrile terpolymer produces the best suspending action, and maintains this advantage at differing pH values.

As the foregoing description indicates, the use of a terpolymer of this invention as a suspending agent for the suspension polymerization of polymerizable monomeric materials offers significant advantages over prior art dispersants. Not only is a wide latitude in composition possible, but the terpolymer can be reproduced, thus avoiding difficulties heretofore encountered in using a natural product, such as gelatin, of varying chemical composition. In addition, polymers obtained are characterized by consistent and excellent heat stability and colloidability.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of polymerizing an unsaturated polymerizable monomeric composition selected from the group consisting of vinyl esters of monocarboxylic acids, vinyl halides and mixtures thereof with further ethylenically unsaturated monomers copolymerizable therewith, which comprises the steps of suspending said monomeric composition in water using as a suspending agent a small amount of styrene-maleic anhydride-acrylonitrile terpolymer defined by the area DEFH in FIGURE 1, and while the monomeric composition is so suspended, effecting polymerization thereof with the aid of heat and a polymerization catalyst.

2. The method of claim 1 wherein the polymerizable monomeric composition is vinyl chloride.

3. The method of claim 1 wherein the polymerizable monomeric composition comprises vinyl chloride and a different copolymerizable monomer.

4. The method of claim 1 wherein the polymerizable monomeric composition comprises vinyl chloride and vinyl acetate.

5. The method of claim 1 wherein the interpolymer is employed in the form of a water soluble salt.

6. The process according to claim 1 wherein the interpolymer is employed in the form of a water-soluble alkali metal salt.

7. The process according to claim 1 wherein the interpolymer is employed in the form of a water-soluble ammonium salt.

8. The method of claim 1 wherein the polymerizable material is vinyl chloride and the interpolymer is employed in the form of a water-soluble salt.

9. The method of claim 1 wherein the polymerizable material comprises vinyl chloride and a copolymerizable monomer, and the interpolymer is employed in the form of a water-soluble salt.

10. The method of claim 1 wherein the polymerizable material comprises vinyl chloride and vinyl acetate, and the interpolymer is employed in the form of a water-soluble salt.

11. A terpolymer of maleic anhydride, acrylonitrile and styrene, the monomeric proportions of which are within the range defined by the area DEFH of FIG. 1.

12. A water-soluble salt of the product of claim 11.

13. An alkali metal salt of the product of claim 11.

14. An ammonium salt of the product of claim 11.

15. A substance obtained by acid-hydrolyzing the product of claim 11.

16. A substance obtained by alkali-hydrolyzing the product of claim 11.

17. A terpolymer of 3.18% by weight of acrylonitrile, 48.30% by weight of maleic anhydride, and 48.52% by weight of styrene.

18. The method of preparing a styrene-maleic anhydride-acrylonitrile terpolymer having a composition defined by the area DEFH in FIG. 1 which comprises the steps of combining 34 to 56% styrene, 38 to 60% maleic anhydride, 2 to 6% acrylonitrile and a peroxy polymerization catalyst in a solvent and polymerizing this mixture at an elevated temperature until a viscous solution of terpolymer is obtained, diluting the terpolymer with a solvent to a predetermined solids content and precipitating from the solution the desired terpolymer, and separating the liquid and recovering the solid terpolymer.

19. The method according to claim 18 wherein the solvent is a non-solvent for the terpolymer.

20. The method according to claim 18 wherein the catalyst is a peroxide catalyst.

21. The method according to claim 18 wherein the terpolymer is converted to a water-soluble terpolymer salt.

22. The method according to claim 18 wherein the solvent is acetone.

23. The method according to claim 18 wherein the precipitant is carbon tetrachloride.

24. The method according to claim 18 wherein the solvent is acetone and the precipitant is carbon tetrachloride.

25. The method according to claim 18 wherein the reactor is initially purged with an inert gas prior to the polymerization reaction.

References Cited in the file of this patent

UNITED STATES PATENTS

| 2,300,566 | Hahn et al. | Nov. 3, 1942 |
| 2,439,227 | Seymour et al. | Apr. 6, 1948 |
| 2,548,318 | Norris | Apr. 10, 1951 |
| 2,675,370 | Barrett | Apr. 13, 1954 |
| 2,719,136 | Caldwell | Sept. 27, 1955 |

FOREIGN PATENTS

| 879,315 | Germany | June 11, 1953 |

OTHER REFERENCES

Seymour et al.: Ind. and Eng. Chem., vol. 41, No. 7, July 1949, pages 1509–1513.

UNITED STATES PATENT OFFICE
CERTIFICATE OF CORRECTION

Patent No. 3,015,653                              January 2, 1962

Roger G. Richards et al.

It is hereby certified that error appears in the above numbered patent requiring correction and that the said Letters Patent should read as corrected below.

Column 7, line 52, for "stream" read -- steam --.

Signed and sealed this 19th day of June 1962.

(SEAL)
Attest:

ERNEST W. SWIDER  
Attesting Officer

DAVID L. LADD  
Commissioner of Patents